(12) United States Patent
Frank et al.

(10) Patent No.: US 8,506,211 B2
(45) Date of Patent: Aug. 13, 2013

(54) COUNTERBALANCED BORING TOOL

(75) Inventors: Peter Frank, Floh-Seligenthal (DE);
Jens Neumann, Wernshausen (DE)

(73) Assignee: Sandvik Intellectual Property AB,
Sandviken (SE)

( * ) Notice: Subject to any disclaimer, the term of this patent is extended or adjusted under 35 U.S.C. 154(b) by 925 days.

(21) Appl. No.: 12/449,029

(22) PCT Filed: Jan. 17, 2008

(86) PCT No.: PCT/EP2008/050525
§ 371 (c)(1),
(2), (4) Date: Nov. 12, 2009

(87) PCT Pub. No.: WO2008/092751
PCT Pub. Date: Aug. 7, 2008

(65) Prior Publication Data
US 2010/0061819 A1    Mar. 11, 2010

(30) Foreign Application Priority Data
Jan. 29, 2007   (DE) .................. 10 2007 004 385

(51) Int. Cl.
*B23B 29/10*    (2006.01)
(52) U.S. Cl.
USPC ......................................... 408/143; 408/181
(58) Field of Classification Search
USPC ......................................... 408/181, 185, 143
See application file for complete search history.

(56) References Cited

U.S. PATENT DOCUMENTS

| 2,906,145 | A | * | 9/1959 | Morse ........................... 408/181 |
| 3,177,738 | A | | 4/1965 | Achilles |
| 3,180,187 | A | | 4/1965 | McFerren |
| 3,309,946 | A | * | 3/1967 | Thomas ........................ 408/153 |
| 4,004,858 | A | | 1/1977 | Szilva |
| 4,899,628 | A | | 2/1990 | Seichter et al. |

(Continued)

FOREIGN PATENT DOCUMENTS

| DE | 815 554 | 10/1951 |
| DE | 29 45 631 | 5/1981 |

(Continued)

OTHER PUBLICATIONS

English translation of the International Preliminary Report on Patentability issued in International Application No. PCT/EP2008/050525, dated Aug. 4, 2009, 4 pages.

*Primary Examiner* — Eric A Gates
*Assistant Examiner* — Paul M Janeski
(74) *Attorney, Agent, or Firm* — Morgan, Lewis & Bockius LLP

(57) ABSTRACT

The invention concerns a boring tool comprising a main tool body and a tool holder which is adjustable relative thereto, as well as a counterweight coupled to the tool holder in such a way that upon a movement of the tool holder in one direction a movement of the counterweight occurs substantially in the opposite direction, wherein both the tool holder and also the counterweight are respectively arranged at least in part in a bore in the main tool body. To provide a boring tool of the above-mentioned kind which is suitable in particular for high rotary speeds, which is advantageous in terms of manufacture and which in addition provides a reliable precise balancing function, it is proposed in accordance with the invention that a tool holder and a counterweight are arranged in the same bore in the main tool body.

14 Claims, 3 Drawing Sheets

(56) References Cited

U.S. PATENT DOCUMENTS

Figure 1:
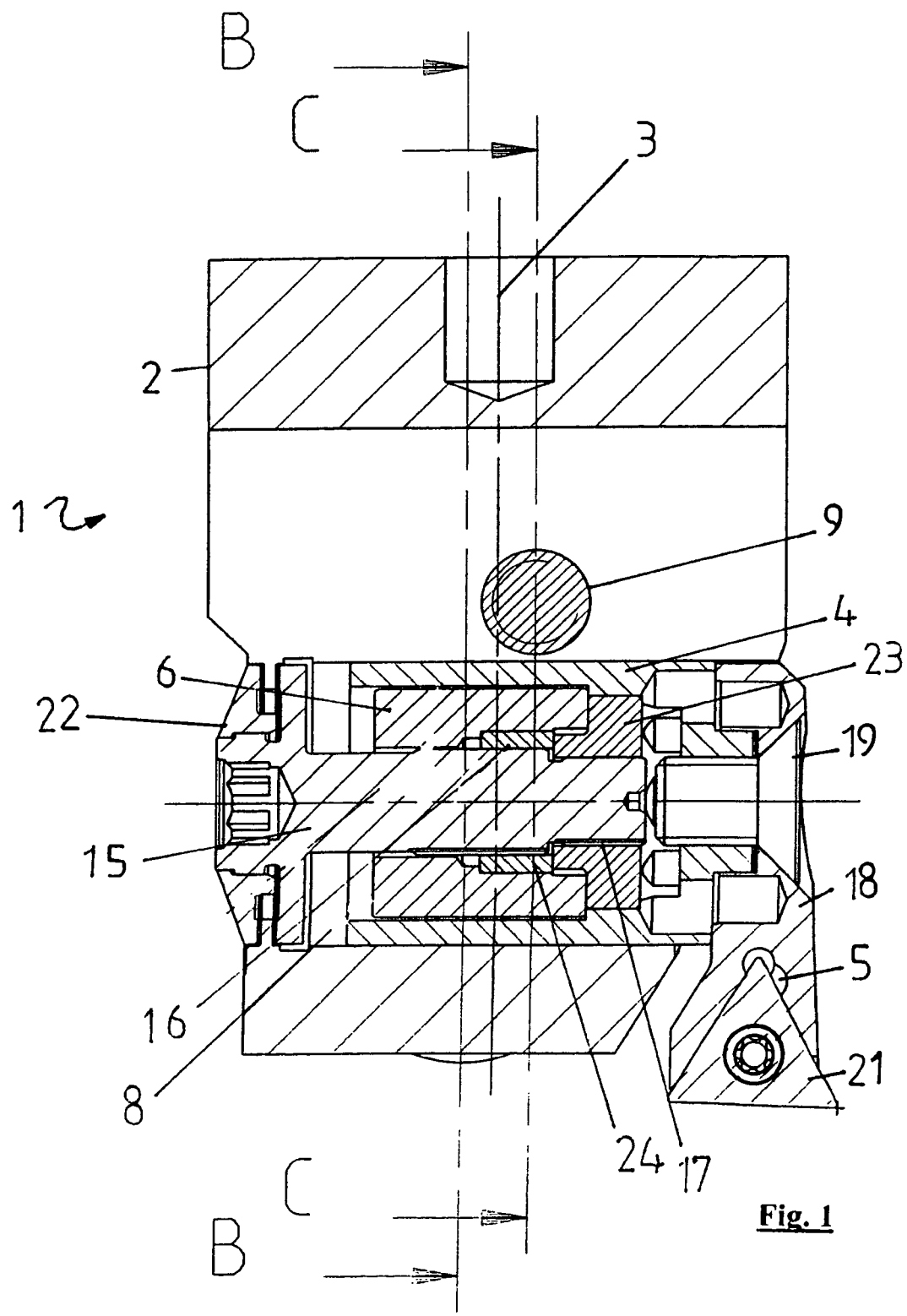

| | | | | |
|---|---|---|---|---|
| 5,396,693 | A | * | 3/1995 | Lohner .................. 29/527.1 |
| 5,611,651 | A | * | 3/1997 | Wohlhaupter et al. ........ 408/153 |
| 5,909,986 | A | | 6/1999 | Kaiser et al. |
| 7,309,194 | B2 | * | 12/2007 | Keefe et al. ................ 408/1 R |
| 7,407,349 | B2 | * | 8/2008 | Kaiser et al. ................ 408/180 |
| 7,585,139 | B2 | * | 9/2009 | Stadelmann et al. ......... 408/181 |
| 2011/0116880 | A1 | * | 5/2011 | Nakamura et al. ............ 408/1 R |

FOREIGN PATENT DOCUMENTS

| | | |
|---|---|---|
| DE | 35 10 259 | 9/1985 |
| DE | 39 26 026 | 2/1991 |
| EP | 0 804 984 | 11/1997 |
| JP | 01-171707 | 7/1989 |

\* cited by examiner

COUNTERBALANCED BORING TOOL

The present invention concerns a boring tool with a main tool body, at the end of which there is provided at least one tool holder which is adjustable relative to the main tool body, wherein the tool holder is movable in the radial direction and can be held fast.

Such boring tools are frequently operated at very high rotary speeds so that it is necessary for the boring tool to be balanced prior to operation. As any radial displacement of the tool holder provides for an unbalance, the tool has to be re-balanced after each such displacement. Boring tools are therefore already known having a counterweight which is coupled to the tool holder in such a way that, upon a movement of the tool holder in one direction, there is a movement of the counterweight substantially in the opposite direction, wherein both the tool holder and also the counterweight is respectively arranged at least in part in a bore in the main tool body.

Such a boring tool is known for example from EP 0 804 984. That boring tool has a clamping member which is intended to come into contact simultaneously with the tool holder and the counterweight. That construction is very complicated and expensive to manufacture. In addition in the course of use it can happen that the clamping member no longer comes exactly simultaneously into contact with the counterweight on the one hand and the tool holder on the other hand so that there is possibly a slight unbalance after fine adjustment has been effected. In addition the counterweight and the tool holder are spaced from each other in the axial direction so that any displacement of the tool holder alters the moments which occur in the tool.

Therefore, taking that state of the art as the basic starting point, the object of the invention is to provide a boring tool of the above-specified kind, which is suitable in particular for high rotary speeds, which is advantageous in terms of manufacture and which in addition provides a reliable precise balancing function.

That object is attained in that the tool holder and the counterweight are arranged in such a way that the movement of the tool holder and the substantially opposite movement of the counterweight are effected on the same axis.

In other words the tool holder and the counterweight are arranged in the same bore in the main tool body.

That arrangement ensures that the center of gravity does not change even in the plane of the tool holder so that the forces within the tool are reduced. The total of the radial forces is preferably zero.

In a preferred embodiment the main tool body has a clamping device, by means of which the main tool body can be elastically deformed so that at least the tool holder and possibly also the counterweight are respectively clamped fast in the bore.

The elastic deformation of the main tool body means that the counterweight and the tool holder are braced in the bore so that the two parts are clamped fast in embracing relationship.

To permit such elastic deformation the main tool body may for example have a slot so that the slot becomes narrower due to the elastic deformation by means of the clamping device.

The clamping device can comprise for example a clamping screw which engages into a screwthreaded bore in the main tool body.

In a particularly preferred feature the clamping device does not come into direct contact either with the tool holder or with the counterweight. That ensures that the tool holder and the counterweight are braced by the bracing action of the main tool body and not by coming into contact with the clamping device, in the main tool body.

In a further particularly preferred embodiment there is provided a guide means for guiding the counterweight in the bore. The guide means serves to ensure the exact movement of the counterweight in the bore. The guide means can comprise for example an opening and a projection, preferably a guide groove and a guide pin. Desirably the guide opening is provided on the counterweight and the guide projection on the main tool body. The projection engages into the opening and thus prevents rotation of the counterweight about its axis within the bore.

In a further particularly preferred embodiment, there is provided a screw element having two screwthreads (double screwthread), for the movement of the tool holder in the main tool body, wherein the one screwthread is in engagement with the tool holder and the other screwthread with the counterweight.

Accordingly, rotation of the screw element produces an oppositely directed movement of the counterweight on the one hand and the tool holder on the other hand. As the counterweight and the tool holder are possibly of different masses, the two screwthreads can also involve a different pitch so that, with a slight movement of the heavier element, the lighter element moves to a correspondingly greater degree in the opposite direction.

Furthermore a particularly preferred embodiment provides that the tool holder and the counterweight comprise materials of different density, wherein preferably the material of the counterweight is of higher density than the material of the tool holder.

Advantageously at least one screwthread and preferably the screwthread coming into engagement with the tool holder is in the form of a fine screwthread. That permits highly precise balancing.

Figure 2:
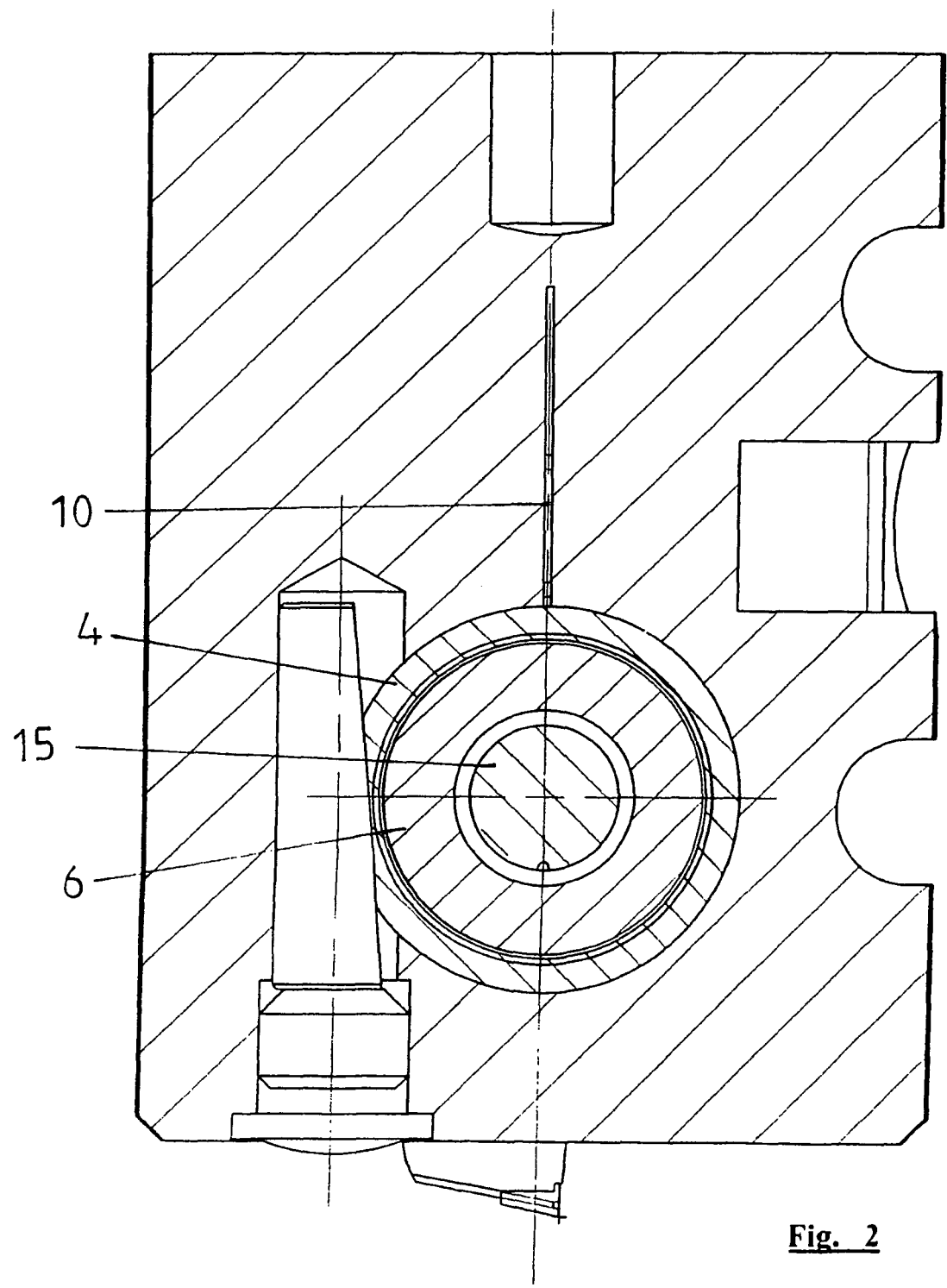
Figure 3:
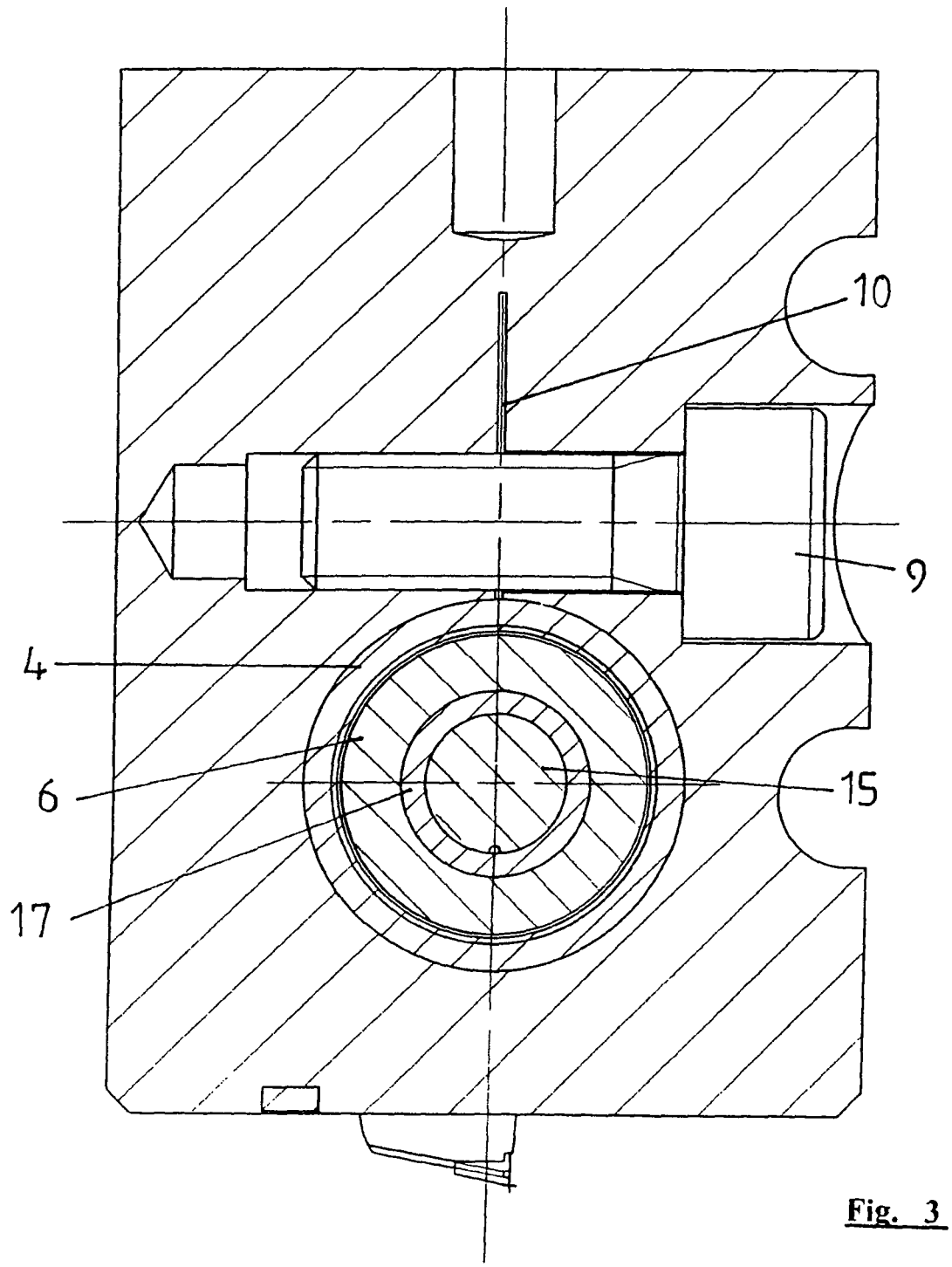

Further advantages, features and possible uses of the present invention will be apparent from the description hereinafter of a preferred embodiment and the accompanying Figures in which:

FIG. 1 shows a longitudinal section of an embodiment of the boring tool according to the invention, FIG. 2 shows a sectional view along line B-B in FIG. 1, and FIG. 3 shows a sectional view along line C-C in FIG. 1.

FIG. 1 shows a longitudinal section through an embodiment by way of example of the boring tool 1 according to the invention. The boring tool 1 comprises a main tool body 2 which in operation rotates about the tool axis 3. The boring tool 1 also has a tool holder 4 to which a cutting bit holder 18 with a cutting bit seat is mounted by means of the screw 19. A cutting bit 21 is accommodated in the cutting bit seat. Disposed in the main tool body 2 is a bore 8 into which both the tool holder 4 and also the counterweight 6 are fitted on a screw element 15.

The tool holder can be moved in a radial direction, that is to say towards the right or the left in FIG. 1, by means of the screw element 15 which engages with a screwthread flight 17 into a screwthreaded bore in the tool holder 4. That measure makes it possible to precisely adjust the machining radius of a cutting bit accommodated on the cutting bit seat 5.

The screw element 15 has two opposite screwthreads so that upon rotation of the screw element 15 that entails for example a displacement of the tool holder 4 together with the cutting bit holder 18 which is fixed to the tool holder 4 by means of the screw 19 and in which the cutting bit 21 is fitted, in a radial direction outwardly, that is to say towards the right in FIG. 1, while the counterweight 6 is moved towards the left in FIG. 1, so that the boring tool is balanced at any time.

Arranging the counterweight 6 and the tool holder 4 on an axis affords various advantages. On the one hand, that means that only one corresponding bore has to be provided in the main tool body 2, which leads to higher stability for the boring tool 1. On the other hand the boring tool 1 can be of a markedly more compact structure.

In addition arranging the counterweight 6 and the tool holder 4 on an axis ensures that the moments of force in the tool are reduced or in the ideal case the forces cancel each other out so that no moments of force occur.

In the illustrated embodiment the counterweight 6 is made from a material which is of higher density than the material from which the tool holder 4 is made. As generally the tool holder 4 together with the cutting bit holder 18 and the cutting bit 21 is of comparatively large dimensions, the choice of a material of higher density for the counterweight 6 means that it can be of smaller dimensions, which also leads to the boring tool 1 being of a more compact structure.

FIG. 1 shows a clamping element 9. As can be seen from FIGS. 2 and 3 the main tool body 2 is provided with a slot 10 so that when the clamping screw 9 is tightened the main tool body is elastically deformed and the tool holder 4 and possibly also the counterweight 6 are braced in the main tool body 2. That ensures that during the machining operation of the boring tool, no unintentional movement of the counterweight 6 and/or the tool holder 4 occurs.

In that case the clamping screw 9 does not come into engagement directly with the counterweight 6 or the tool holder 4.

In addition there is basically the possibility of making various tool holders 4 and/or cutting bit holders 18 available, which are admittedly each of the same weight but are of a different configuration in terms of arrangement so that the possible adjustable radius of the cutting bit 21 is increased.

The screw element 15 or the cover 22 can also have a scale.

LIST OF REFERENCES 1 boring tool
2 main tool body
3 tool axis
4 tool holder
5 cutting bit seat
6 counterweight
8 bore
9 clamping device
10 slot
15 screw element
16,17 screwthread
18 cutting bit holder
19 cutting bit holder clamping screw
21 cutting bit
22 cover optionally with scale
23 bush of the tool holder
24 screwthreaded bush of the counterweight

The invention claimed is:

1. A boring tool comprising a main tool body and a tool holder which is adjustable relative thereto, as well as a counterweight coupled to the tool holder in such a way that upon a movement of the tool holder in one direction a movement of the counterweight occurs substantially in the opposite direction,
wherein both the tool holder and also the counterweight are respectively arranged at least in part in a bore in the main tool body,
wherein the tool holder and the counterweight are arranged in the same bore in the main tool body, and
wherein the tool holder and the counterweight are arranged concentric to an adjustment axis, the adjustment axis perpendicular to a tool axis about which the main tool body operationally rotates, and are arranged with at least a portion of each of the tool holder and the counterweight intersecting the tool axis.

2. A boring tool as set forth in claim 1 wherein a screw element having two screwthreads is provided for the movement of the tool holder, wherein a first screwthread is in engagement with the tool holder and a second screwthread is engagement with the counterweight.

3. A boring tool as set forth in claim 1 wherein the tool holder and the counterweight comprise materials of different density.

4. A boring tool as set forth in claim 3 wherein the material of the counterweight is of a higher density than the material of the tool holder.

5. A boring tool as set forth in claim 1 wherein there is provided a guide means for guiding the counterweight in the bore.

6. A boring tool as set forth in claim 5 wherein the guide means comprises a guide bolt arranged within a bore in the counterweight.

7. A boring tool as set forth in claim 5 wherein the guide means preferably provides a rotation-preventing means which substantially prevents rotation of the counterweight about the axis of the bore in which the counterweight is arranged.

8. A boring tool as set forth in claim 5 wherein the guide means comprises a guide opening and a guide projection, wherein the guide opening is provide on one of the elements being the counterweight or the main tool body, and the guide projection is arranged on the other element.

9. A boring tool as set forth in claim 8 wherein the guide opening is provided on the counterweight.

10. A boring tool as set forth in claim 8 wherein the guide opening is provided on the main tool body.

11. A boring tool comprising a main tool body and a tool holder which is adjustable relative thereto, as well as a counterweight coupled to the tool holder in such a way that upon a movement of the tool holder in one direction a movement of the counterweight occurs substantially in the opposite direction,
wherein both the tool holder and also the counterweight are respectively arranged at least in part in a bore in the main tool body,
wherein the tool holder and the counterweight are arranged in the same bore in the main tool body, and
wherein the main tool body has a clamping device, by means of which the main tool body can be elastically deformed so that both the tool holder and also the counterweight are respectively clamped in the bore.

12. A boring tool as set forth in claim 11 wherein the main tool body has a slot and the main tool body can be elastically deformed by means of the clamping device in such a way that the slot becomes narrower.

13. A boring tool as set forth in claim 11 wherein the clamping device comprises a clamping screw engaging into a screwthreaded bore in the main tool body.

14. A boring tool as set forth in claim 11 wherein the clamping device is not in direct contact either with the tool holder or with the counterweight.

* * * * *